(12) United States Patent
Qiu et al.

(10) Patent No.: US 9,695,318 B2
(45) Date of Patent: Jul. 4, 2017

(54) INORGANIC/LIGNIN TYPE POLYMER COMPOSITE NANOPARTICLES, PREPARATION METHOD THEREFOR AND APPLICATION THEREOF

(71) Applicant: SOUTH CHINA UNIVERSITY OF TECHNOLOGY, Guangzhou, Guangdong (CN)

(72) Inventors: Xueqing Qiu, Guangzhou (CN); Dongjie Yang, Guangzhou (CN); Wenyuan Guo, Guangzhou (CN); Mingsong Zhou, Guangzhou (CN); Jinhao Huang, Guangzhou (CN); Conghua Yi, Guangzhou (CN); Yuan Li, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 15/105,345

(22) PCT Filed: Nov. 28, 2014

(86) PCT No.: PCT/CN2014/092437
§ 371 (c)(1),
(2) Date: Jun. 16, 2016

(87) PCT Pub. No.: WO2015/090138
PCT Pub. Date: Jun. 25, 2015

(65) Prior Publication Data
US 2016/0312031 A1   Oct. 27, 2016

(30) Foreign Application Priority Data
Dec. 16, 2013  (CN) .......................... 2013 1 0687595

(51) Int. Cl.
| C08L 97/00 | (2006.01) |
| C08K 3/00 | (2006.01) |
| C08K 9/04 | (2006.01) |
| C08K 3/26 | (2006.01) |
| C08K 3/36 | (2006.01) |
| C08H 7/00 | (2011.01) |
| C08K 3/22 | (2006.01) |
| C08K 3/08 | (2006.01) |

(52) U.S. Cl.
CPC .............. *C08L 97/005* (2013.01); *C08H 6/00* (2013.01); *C08K 3/00* (2013.01); *C08K 3/0033* (2013.01); *C08K 3/22* (2013.01); *C08K 3/26* (2013.01); *C08K 3/36* (2013.01); *C08K 9/04* (2013.01); *C08K 2003/0893* (2013.01); *C08K 2003/2227* (2013.01); *C08K 2003/2241* (2013.01); *C08K 2003/2296* (2013.01); *C08K 2003/265* (2013.01); *C08K 2003/267* (2013.01)

(58) Field of Classification Search
CPC .......... C08L 97/005; C08K 3/36; C08K 3/22; C08K 3/26; C08K 2003/2296; C08K 2003/2241; C08K 2003/2227; C08K 2003/265; C08H 6/00
USPC .......................................................... 524/73
See application file for complete search history.

(56) References Cited

U.S. PATENT DOCUMENTS 4,892,587 A * 1/1990 Dilling ..................... C08H 6/00
                                                         106/501.1

FOREIGN PATENT DOCUMENTS

| CN | 101173107 A | 5/2008 |
| CN | 102718995 A | 10/2012 |
| CN | 103709772 A | 4/2014 |

OTHER PUBLICATIONS

Hawari, Jalal et al., "Grafting of lignin onto nanostructured silica SBA-15: preparation and characterization," Journal of Porous Materials, vol. 20, No. 1, (2013), pp. 227-233.
Chen, Yun-ping et al., "Preparation of lignin composite material and its application in ethylene propylene rubber," Modern Chemistry Industry, (2009), vol. 29, No. 2, pp. 36-40.
Feb. 9, 2015 Search Report issued in International Patent Application No. PCT/CN2014/092437.

* cited by examiner

*Primary Examiner* — Hui Chin
(74) *Attorney, Agent, or Firm* — Oliff PLC

(57) ABSTRACT

The preparation method includes: adding an activating agent into a basic alkaline lignin solution first, then adding a carboxylating agent and reacting to obtain a carboxylated alkaline lignin; dissolving a phosphorylating agent into water, adding epichlorohydrin, and reacting to obtain a hydroxyl phosphate type compound; mixing the carboxylated alkaline lignin and the hydroxyl phosphate type compound and reacting to obtain a lignin type polymer; adding an inorganic nanoparticle suspension into the lignin type polymer and adding an acid for codeposition to obtain the product after aging and drying.

15 Claims, 2 Drawing Sheets

INORGANIC/LIGNIN TYPE POLYMER COMPOSITE NANOPARTICLES, PREPARATION METHOD THEREFOR AND APPLICATION THEREOF

FIELD OF THE INVENTION

The present invention relates to composite nanoparticles, especially inorganic/lignin type polymer composite nanoparticles, preparation method therefor and application thereof.

BACKGROUND OF THE INVENTION

The inorganic/polymer composite nanomaterials, which refer to the composite materials, are produced by compounding inorganic nanoparticles with organic high polymers (e.g., plastics, rubbers, etc.) as the continuous phase. The inorganic/polymer composite nanomaterials not only have the advantages of rigidity, dimensional stability and thermal stability of inorganic nanoparticles, but also have the advantages of processability, toughness and dielectric properties of polymers. They can achieve the superiority not possessed by an individual component through synergy among the components and it can prepare a new high polymer composite material, which has broad application foreground in mechanics, optics, electronics, magnetics, biology and other fields. In practical applications, however, since the inorganic nanoparticles are easy to glomerate in a polymer matrix and difficult to disperse, and have poor compatibility with polymers, there is often no real orderly assembly between the inorganic nanoparticles and the polymers. Uniform dispersion of nanoparticles is the foundation of nanostructure, and also an important properties of composite materials. The inorganic nanoparticles are poor in dispersibility and difficult to be interfused, and are easy to produce an inorganic phase aggregate in the composite material, thus they are neither able to be compounded with polymers on a nano scale nor able to better play nanometer effects, limiting their wide application. In addition, the high cost of inorganic nanoparticles is also the reason of their applied limitation.

Therefore, if the inorganic nanoparticles are first subject to surface chemical modification with organic compounds that are both inexpensive and environmentally friendly, so as to improve their dispersivity and surface polarity to produce inorganic/organic composite nanoparticles, and then the composite nanoparticles are compounded with polymers to produce the composite nanomaterial, the glomeration among the inorganic nanoparticles can be effectively prevented, which will improve their compatibility with the polymers and their application properties.

Currently, the surface chemical modifiers of the inorganic nanoparticles are mainly fatty alcohols, amines, fatty acids, silicones, etc., most of which come from fossil resources. While lignin, the biomass resource preceded only by cellulose in content in nature, is rarely applied in this field.

Non-renewable fossil resources are increasingly depleted, and environmental issues of papermaking waste are becoming increasingly prominent, making recovery and utilization of the lignin renewable resource in the papermaking waste particularly important. lignin is the only non-petroleum resource in nature that can provide renewable aryl compounds, accounting for about 20%-30% by weight of the plant body. In the pulping and papermaking process, the lignin within the plant body is usually dissolved out to become a main component of the waste liquid, and therefore recovery and utilization of the industrial lignin is an effective way to manage the pulping and papermaking waste liquid issues. With currently more than 30 million tons of industrial lignin produced annually all over the world, using abundant and inexpensive alkaline lignin as the raw material to develop new products and open up new fields of application will help promote the "clean production and recycling economy" of the pulping and papermaking industry, which is in line with sustainable development objectives and has positive environmental and social significance.

The alkaline lignin moleculesextracted from the papermaking waste liquid, containing phenolic hydroxyl group, carbonyl group, benzene ring, ether bond, carbon-carbon double bond, etc., rich in active hydroxyl groups on the surface, can be endowed with excellent reactivity and adsorption properties through chemical modification, achieve the hydrophilic-lipophilic balance value of different proportions, and therefore be stably dispersed in polymers of different polarity. Besides, lignin is renewable, degradable, nonpoisonous, inexpensive and widely available and has other advantages and is an excellent "green" chemical raw material, and therefore its comprehensive utilization draws much attention.

The modified alkaline lignin has been widely used as a dispersant in pesticides, ceramics, coal water slurry, cement, dyes and other fields. However, with development and utilization of the alkaline lignin currently still at a low value-added level, how to utilize the widely available industrial lignin to develop a greater variety of lignin products with excellent properties to achieve the high-value utilization of lignin will become an important direction of the lignin research. Efficiently modifying the alkaline lignin to prepare the lignin type nanomaterials will bring novel and wide application foreground for lignin, and also promote the high-value utilization of lignin to a new height.

A Chinese patent CN 101173107B disclosed lignin-inorganic nanocomposite materials and preparation method therefor on Mar. 16, 2011, which used the following preparation method: First pretreating the inorganic nanoparticles with lignosulfonic acid, ammonium lignosulfonate and other water-soluble lignin surface treatment agents and coupling agents, then adding them to the lignin or their derivatives, and then carrying out acid precipitation, filtration and drying to obtain the product. Cheng Xiansu et al. (Chen Yunping, Cheng Xiansu, *Preparation of lignin-based composite materials and their application in ethylene-propylene rubber* [J] 2009, 29 (2): 36-40) prepared an ethylene-propylene rubber reinforcing agent by compounding high boiling solvent lignin and nano silica, with the preparation method similar to the aforementioned patent (CN 101173107 B). Hawari J. et al. [Saad R., Hawari J. *Grafting of lignin onto nanostructured silica sba-15: preparation and characterization* [J]. Journal of Porous Materials, 2013, 20 (1): 227-233] used triethoxy chlorosilane to react with lignin, then blended with the nano silica prepared by the sol-gel method, and then refluxed in toluene before flushing with pyridine, and finally dried to obtain the composite particles.

Currently, preparation of the lignin/inorganic nanocomposite particles has many disadvantages: (1) In the preparation process, expensive silane coupling agent, titanate coupling agent, zirconate coupling agent, etc., or an organic solvent which contain certain toxicity needs to be used as an assistant for surface modification of inorganic nanoparticles, and the preparation cannot be performed at room temperature and atmospheric pressure, thus increasing the cost; (2) the lignin used, undergoing no necessary chemical modification, cannot achieve dispersibility fundamentally; with weak interaction between lignin and inorganic nanoparticles, the inorganic nanoparticles can be pre-dispersed only after a lignin surface treatment agent is additionally added as a dispersant. Therefore, the prepared composite nanoparticles still suffer from serious surface agglomeration, difficult to have their properties improved significantly in application to high polymer materials.

CONTENTS OF THE INVENTION

The one purpose of the present invention is as follows: In order to overcome the defects of the inorganic nanoparticles such as easy glomeration in the polymer matrix, difficulty in dispersion, and poor compatibility with polymers, chemically modifying the alkaline lignin by grafting active groups, then using the alkaline lignin to chemically modify the surface of the inorganic nanoparticles, and then using the synergy between the modified alkaline lignin and the inorganic nanoparticles to produce the affordable and uniformly dispersed inorganic/lignin polymer composite nanoparticles with excellent properties, which are then compounded efficiently with plastics, rubbers and other high polymers to improve their mechanical properties.

The lignin type polymer, using the alkaline lignin as the main raw material, is grafted with a carboxyl group, a phosphate group and other active groups through chemical modification at atmospheric pressure, thereby enhancing the interaction between the lignin type polymer and the inorganic nanoparticles. With adsorption of the lignin type polymer on the inorganic nanoparticles, together with the steric hindrance formed by the three-dimensional spatial network structure of the lignin itself, glomeration among the inorganic nanoparticles can be overcome effectively to make the inorganic nanoparticles dispersed uniformly.

The prepared inorganic/lignin type polymer composite nanoparticles have good dispersibility, and strong compatibility with high polymers. This composite material can significantly improve the mechanical properties of high polymer materials such as plastics and rubbers, Another purpose of the present invention is to provide a method of preparing the above inorganic/lignin type polymer composite nanoparticles.

These purpose of the present invention are achieved through the following technical solutions:

The preparing method of the inorganic/lignin type polymer composite nanoparticles is provided, characterized by comprising the following steps:

(1)The alkaline lignin solid was dissolved into water to form suspension at concentration of 30%-50% by weight, adjusting the pH to 9-12 with an alkalinity regulator, heating to 60° C.-90° C., adding an activating agent, and reacting for 0.5-2 hours; dissolving a carboxylating agent in a formulation into water to formulate a solution at a concentration of 10%-30% by weight and adding to the above alkaline lignin suspension, and reacting for 1-3 hours at 60° C.-90° C. to produce the carboxylated alkaline lignin;

(2) dissolving a phosphorylating agent in the formulation into water to formulate a solution at a concentration of 10%-35% by weight, adding epichlorohydrin, heating to 30° C.-90° C., and reacting for 0.5-3 hours to produce a hydroxyl phosphate type compound;

(3) mixing the carboxylated alkaline lignin in Step (1) with the hydroxyl phosphate type compound in Step (2), adjusting the pH to 10-13 with an alkalinity regulator, heating to 75° C.-95° C., reacting for 0.5-2 hours, and cooling to room temperature to produce a liquid lignin type polymer;

(4) adding inorganic nanoparticles into water to formulate a suspension at a concentration of 10%-40% by weight, adding a pretreatment agent, stirring well before adding the liquid lignin type polymer in Step (3), heating to 50° C.-80° C., reacting for 0.5-2 hours, then adding an acidity regulator to regulate the pH to 3-5 before ageing at 50° C.-80° C. for 0.5-4 hours, and then spray-drying to produce the inorganic/lignin type polymer composite nanoparticles;

the amount of each reactant is as follows in parts by weight:

| alkaline lignin | 100 |
| inorganic nanoparticles | 5-80 |
| activating agent | 2-10 |
| carboxylating agent | 5-20 |
| phosphorylating agent | 5-20 |
| epichlorohydrin | 5-15 |
| pretreatment agent | 5-10 | the activating agent is one or two agents selected from the group consisting of dioxane, sodium periodate, ethanol, isopropanol and acetone;

the inorganic nanoparticles are one selected from the group consisting of nano silica, nano alumina, nano zinc oxide, nano titanium dioxide and nano calcium carbonate;

the carboxylating agent is one or two agents selected from the group consisting of monochloroacetic acid, monobromoacetic acid, monoiodoacetic acid, sodium monochloroacetate and dichloroacetic acid;

the phosphorylating agent is one or two agents selected from the group consisting of sodium dihydrogen phosphate, disodium hydrogen phosphate, dipotassium hydrogen phosphate, potassium dihydrogen phosphate and diammonium hydrogen phosphate; and the pretreatment agent is one selected from the group consisting of ethanol, acetone, glycerol, isopropanol and cyclohexane.

In order to further achieve the purpose of the present invention, the alkaline lignin is one or two substances selected from the group consisting of wheat straw alkaline lignin, bamboo pulp alkaline lignin, reed alkaline lignin, wood pulp alkaline lignin, cotton pulp alkaline lignin and bagasse alkaline lignin.

The alkalinity regulator is NaOH aqueous solution at a concentration of 30% by mass.

The acidity regulator is sulfuric acid, phosphoric acid or hydrochloric acid. The sulfuric acid, the phosphoric acid or the hydrochloric acid has a mass concentration of 10%-30%.

An inorganic/lignin type polymer composite nanoparticle is provided, prepared by the above method.

Application of the inorganic/lignin type polymer composite nanoparticles: Blending the inorganic/lignin type polymer composite nanoparticles and plastics or rubbers in an amount of 10%-40% by dry-basis weight of plastics or rubbers, to produce a high polymer composite material.

The present invention has the following advantages and additional effects compared to the prior art:

(1) The lignin type polymer molecule of the present invention contains a carboxyl group, a phosphate group and other active groups, which increase adsorption sites and adsorption strength of the lignin type polymer on the surface of the inorganic nanoparticles and, together with the steric hindrance formed by the three-dimensional spatial network structure of the lignin itself, can effectively overcome glomeration among the inorganic nanoparticles to make the inorganic nanoparticles dispersed uniformly.

(2) With the present invention overcoming the defects of the inorganic nanoparticles such as easy glomeration in the polymer matrix, difficulty in dispersion, and poor compatibility with polymers, the prepared inorganic/lignin type polymer composite nanoparticles have good dispersibility and strong compatibility with high polymers, and can remarkably improve the mechanical properties of high polymer materials such as plastics and rubbers, with their amount at 10%-40% by dry-basis weight of the plastics or the rubbers.

(3) The raw material used in the present invention is the alkaline lignin recovered from the alkaline pulping waste, belonging to renewable resources. With the preparation process proceeding under normal pressure, the present invention has simple process, excellent cost performance, and high efficiency.

DETAILED DESCRIPTION OF THE EMBODIMENTS

Figure 1:
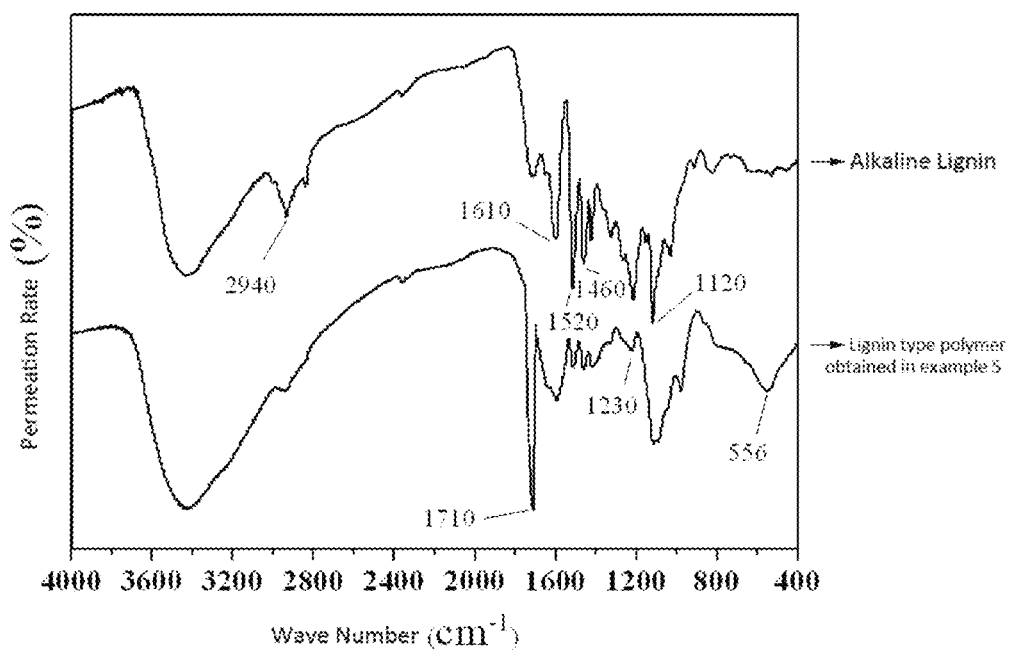
FIG. 1 shows the infrared spectrum of the lignin type polymer prepared in Example 5 and the raw material wood pulp alkaline lignin.

The present invention will be described below in detail with reference to drawings and examples; however, the scope of protection claimed by the present invention is not limited to the scope indicated by the examples.

EXAMPLE 1

Dissolving 100 g bagasse alkaline lignin solid into water to formulate a suspension at a concentration of 30% by weight, regulating the pH to 9 with NaOH at a mass concentration of 30%, heating to 60° C., adding 2 g dioxane, and reacting for 0.5 hour; dissolving 5 g monochloroacetic acid into water to formulate a solution at a concentration of 10% by weight and adding to the above alkaline lignin suspension, and reacting for 1 hour at 60° C. to produce a carboxylated alkaline lignin.

Dissolving 5 g sodium dihydrogen phosphate into water to formulate a solution at a concentration of 10% by weight, adding 5 g epichlorohydrin, heating to 30° C., and reacting for 0.5 hour to produce a hydroxyl phosphate type compound.

Mixing the obtained carboxylated alkaline lignin and the hydroxyl phosphate type compound, regulating the pH to 10 with NaOH at a mass concentration of 30%, heating to 75° C., reacting for 0.5 hour, and cooling to room temperature to produce a liquid lignin type polymer.

Adding 5 g nano silica into water to formulate a suspension at a concentration of 40% by weight, adding 5 g ethanol, stirring well before adding the above liquid lignin type polymer, heating to 50° C., reacting for 0.5 hour, then adding sulfuric acid at a mass concentration of 25% to regulate the pH to 3 and ageing at 50° C. for 1 hour, and then spray-drying to produce the inorganic/lignin type polymer composite nanoparticles.

EXAMPLE 2

Dissolving 100 g wheat straw alkaline lignin solid into water to formulate a suspension at a concentration of 50% by weight, regulating the pH to 12 with NaOH at a mass concentration of 30%, heating to 90° C., adding 10 g ethanol, and reacting for 2 hours; dissolving 15 g monochloroacetic acid and 5 g monobromo acetanilide into water to formulate a solution at a concentration of 30% by weight and adding to the above alkaline lignin suspension, and reacting for 3 hours at 90° C. to produce a carboxylated alkaline lignin.

Dissolving 20 g dipotassium hydrogen phosphate into water to formulate a solution at a concentration of 35% by weight, adding 15 g epichlorohydrin, heating to 90° C., and reacting for 3 hours to produce a hydroxyl phosphate type compound.

Mixing the obtained carboxylated alkaline lignin and the hydroxyl phosphate type compound, regulating the pH to 13 with NaOH at a mass concentration of 30%, heating to 95° C., reacting for 2 hours, and cooling to room temperature; and stirring well to produce a liquid lignin type polymer.

Adding 80 g zinc oxide into water to formulate a suspension at a concentration of 40% by weight, adding 10 g glycerol, stirring well before adding the above liquid lignin type polymer, heating to 80° C., reacting for 2 hours, then adding phosphoric acid at a mass concentration of 30% to regulate the pH to 55 and ageing at 80° C. for 4 hours, and then spray-drying to produce the inorganic/lignin type polymer composite nanoparticles.

EXAMPLE 3

Dissolving 50 g reed alkaline lignin and 50 g bamboo pulp alkaline lignin solid into water to formulate a suspension at a concentration of 40% by weight, regulating the pH to 11 with NaOH at a mass concentration of 30%, heating to 70° C., adding 4 g acetone, and reacting for 1.5 hours; dissolving 5 g monoiodoacetic acid and 10 g dichloroacetic acid into water to formulate a solution at a concentration of 30% by weight and adding to the above alkaline lignin suspension, and reacting for 1.5 hours at 80° C. to produce a carboxylated alkaline lignin.

Dissolving 10 g sodium dihydrogen phosphate and 5 g diammonium hydrogen phosphate into water to formulate a solution at a concentration of 20% by weight, adding 10 g epichlorohydrin, heating to 30° C., and reacting for 2 hours to produce a hydroxyl phosphate type compound.

Mixing the obtained carboxylated alkaline lignin and the hydroxyl phosphate type compound, regulating the pH to 11 with NaOH at a mass concentration of 30%, heating to 90° C., reacting for 1 hour, and cooling to room temperature to produce a liquid lignin type polymer.

Adding 20 g nano titanium dioxide into water to formulate a suspension at a concentration of 20% by weight, adding 8 g ethanol, stirring well before adding the above liquid lignin type polymer, heating to 60° C., reacting for 1.5 hours, then adding phosphoric acid at a mass concentration of 15% to regulate the pH to 4.5 and ageing at 80° C. for 2 hours, and then spray-drying to produce the inorganic/lignin type polymer composite nanoparticles.

EXAMPLE 4

Dissolving 70 g cotton pulp alkaline lignin and 30 g wood pulp alkaline lignin solid into water to formulate a suspension at a concentration of 50% by weight, regulating the pH to 9 with NaOH at a mass concentration of 30%, heating to 60° C., adding 5 g isopropanol and 5 g ethanol, and reacting for 0.5 hour; dissolving 10 g monochloroacetic acid into water to formulate a solution at a concentration of 15% by weight and adding to the above alkaline lignin suspension, and reacting for 3 hours at 60° C. to produce a carboxylated alkaline lignin.

Dissolving 10 g potassium dihydrogen phosphate and 10 g disodium hydrogen phosphate into water to formulate a solution at a concentration of 35% by weight, adding 15 g epichlorohydrin, heating to 80° C., and reacting for 1 hour to produce a hydroxyl phosphate type compound.

Mixing the obtained carboxylated alkaline lignin and the hydroxyl phosphate type compound, heating to 80° C., reacting for 1 hour, and cooling to room temperature to produce a liquid lignin type polymer.

Adding 15 g nano alumina into water to formulate a suspension at a concentration of 25% by weight, adding 6 g isopropanol, stirring well before adding the above liquid lignin type polymer, heating to 80° C., reacting for 1 hour, then adding hydrochloric acid at a mass concentration of 20% to regulate the pH to 4 and ageing at 60° C. in a water bath for 3 hours, and then spray-drying to produce the inorganic/lignin type polymer composite nanoparticles.

EXAMPLE 5

Dissolving 100 g wood pulp alkaline lignin solid into water to formulate a suspension at a concentration of 35% by weight, regulating the pH to 12 with NaOH at a mass concentration of 30%, heating to 75° C., added 1 g sodium periodate and 4 g ethanol, and reacting for 1 hour; dissolving 10 g monoiodoacetic acid agent and 10 g sodium monochloroacetate into water to formulate a solution at a concentration of 20% by weight and adding to the above alkaline lignin suspension, and reacting for 1 hour at 90° C. to produce a carboxylated alkaline lignin.

Dissolving 10 g potassium dihydrogen phosphate into water to formulate a solution at a concentration of 30% by weight, adding 10 g epichlorohydrin, heating to 50° C., and reacting for 2 hours to produce a hydroxyl phosphate type compound.

Mixing the obtained carboxylated alkaline lignin and the hydroxyl phosphate type compound, regulating the pH to 12 with NaOH at a mass concentration of 30%, heating to 80° C., reacting for 1.5 hours, and cooling to room temperature; adding 4 g polyethylene glycol and 2 g hexadecyl trimethoxy ammonium bromide, and stirring well to produce a liquid lignin type polymer.

Adding 35 g nano calcium carbonate into water to formulate a suspension at a concentration of 10% by weight, adding 5 g acetone, stirring well before adding the above liquid lignin type polymer, heating to 75° C., reacting for 0.5 hour, then adding hydrochloric acid at a mass concentration of 20% to regulate the pH to 5 and ageing at 70° C. for 4 hours, and then spray-drying to produce the inorganic/lignin type polymer composite nanoparticles.

EXAMPLE 6

Dissolving 60 g bamboo pulp alkaline lignin and 40 g reed alkaline lignin solid into water to formulate a suspension at a concentration of 45% by weight, regulating the pH to 10 with NaOH at a mass concentration of 30%, heating to 85° C., adding 4 g dioxane, and reacting for 2 hours; dissolving 5 g monochloroacetic acid and 12 g sodium monochloroacetate into water to formulate a solution at a concentration of 20% by weight and adding to the above alkaline lignin suspension, and reacting for 1 hour at 85° C. to produce a carboxylated alkaline lignin.

Dissolving 8 g sodium dihydrogen phosphate and 7 g dipotassium hydrogen phosphate into water to formulate a solution at a concentration of 20% by weight, adding 12 g epichlorohydrin, heating to 60° C., and reacting for 2.5 hours to produce a hydroxyl phosphate type compound.

Mixing the obtained carboxylated alkaline lignin and the hydroxyl phosphate type compound, regulating the pH to 10 with NaOH at a mass concentration of 30%, heating to 75° C., reacting for 2 hours, and cooling to room temperature; adding 4 g nonylphenol polyoxyethylene ether, and stirring well to produce a liquid lignin type polymer.

Adding 5 g nano silica into water to formulate a suspension at a concentration of 15% by weight, adding 5 g cyclohexane, stirring well before adding the above liquid lignin type polymer, heating to 55° C., reacting for 1 hour, then adding sulfuric acid at a mass concentration of 10% to regulate the pH to 3 and ageing at 50° C. for 1.5 hours, and then spray-drying to produce the inorganic/lignin type polymer composite nanoparticles.

DESCRIPTION OF EFFECTS OF EXAMPLES

FIG. 1 shows an infrared spectrum of the lignin type polymer prepared in Example 5 (referred to as "Example 5") and the raw material wood pulp alkaline lignin. It can be known from this figure that, compared to the wood pulp alkaline lignin, Example 5 has weaker absorption than the alkaline lignin at 2940 $cm^{-1}$ (C—H stretching vibration of a methyl, a methylene and a methine) and 1120 $cm^{-1}$ (C—O on a lilac unit), indicating that the modification reaction removes a methoxyl off part of the aromatic ring; Example 5 has weaker absorption than the alkaline lignin at 1610 $cm^{-1}$ and 1520 $cm^{-1}$ (skeletal vibration of an aromatic ring), 1460 $cm^{-1}$ (deformation of a methyl C—H) and 1230 $cm^{-1}$ (C=O stretching of a guaiacyl), indicating that the modification reaction changes the molecular structure of the alkaline lignin to a larger extent; compared to the wood pulp alkaline lignin, Example 5 has stronger absorption at 1710 $cm^{-1}$, which is a characteristic peak of a carboxyl group, and has stronger absorption at 556 $cm^{-1}$, which is a characteristic peak of a phosphate group, both indicating the introduction of more active functional groups, i.e. carboxyl groups and phosphate groups, into the molecule of Example 5.

Figure 2:
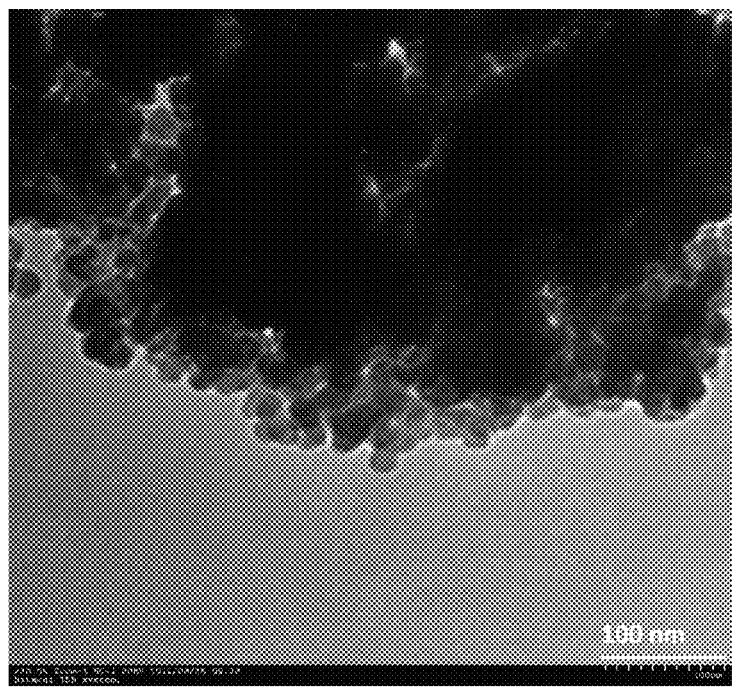
FIG. 2 shows a TEM image of nano silica.
Figure 3:
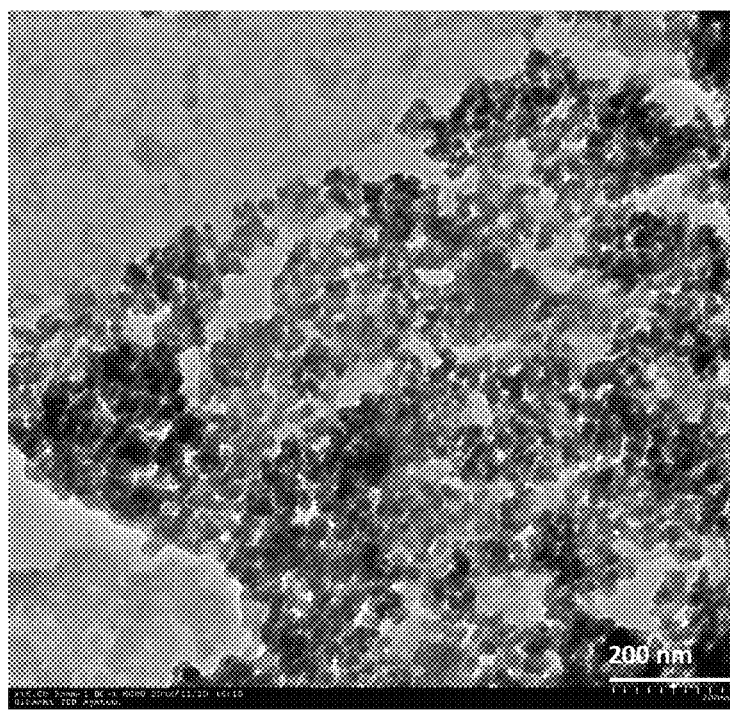
FIG. 3 shows a TEM image of the silica/lignin type polymer composite nanoparticles prepared in Example 1.

FIG. 2 shows a TEM image of nano silica. FIG. 3 shows a TEM image of the silica/lignin type polymer composite nanoparticles prepared in Example 1. It can be seen obviously by comparing FIG. 2 and FIG. 3 that, nano silica is easy to agglomerate and has poor dispersibility, while the prepared silica/lignin type polymer composite nanoparticles have good dispersibility and significantly reduced glomeration among particles, and also have a uniform particle size of about 35 nm With the process used in other examples similar to Example 1, it is found through tests that the TEM images of the products obtained in other examples are basically consistent with those of the products of Example 1, and will therefore not be repeated.

TABLE 1

| Name | Blending mass ratio (Assistant:high-density polyethylene) | Tensile strength (Mpa) | Tensile elongation at break (%) | Density (g · cm$^{-3}$) |
| --- | --- | --- | --- | --- |
| High-density polyethylene | — | 21.98 | 230.22 | 0.85 |
| Calcium carbonate/high-density polyethylene composite material | 10:100 | 24.85 | 65.85 | 1.01 |
| Nano silica/high-density polyethylene composite material | 10:100 | 25.34 | 83.15 | 0.99 |
| Products of Example 1/high-density polyethylene composite material | 10:100 | 30.33 | 92.16 | 0.92 |
| Products of Example 3/high-density polyethylene composite material | 30:100 | 29.78 | 91.23 | 0.90 |
| Products of Example 4/high-density polyethylene composite material | 40:100 | 29.96 | 91.36 | 0.88 |

* The symbol "—" in the table means blank.

Table 1 shows the results of blending modification of the inorganic/lignin type polymer composite nanoparticles obtained in Examples 1, 3 and 4 of the present invention and the high-density polyethylene.

The experimental operation method is as follows: Mixing an assistant (calcium carbonate, nano silica or the products of the examples) with high-density polyethylene pellets according to a certain mass ratio, then physically blending them at 150° C. with a mill for 20 minutes, and then molding the cake to produce the assistant/high-density polyethylene composite material. The tensile strength, tensile elongation at break and other mechanical properties of the composite material are determined with an MTS universal tester, and density as well.

The calcium carbonate used in the experiments is the modified calcium carbonate used in the industrial blow molding. It can be seen from Table 1 that, although the tensile elongation at break of each composite material is lower than that of the high-density polyethylene, the tensile elongation at break of the composite materials obtained from Examples 1, 3 and 4 is far greater than that of the composite materials obtained from calcium carbonate or nano silica, which indicates that the composite materials obtained from Examples 1, 3 and 4 have good toughness and have exceeded the calcium carbonate strengthened polyethylene materials currently commonly used in industry.

The tensile strength of the composite materials obtained from Examples 1, 3 and 4 is 30.33 Mpa, 29.78 Mpa and 29.96 Mpa, respectively, greater than 24.85 Mpa of the calcium carbonate strengthened polyethylene material, 25.34 Mpa of the nano silica strengthened polyethylene material, and 21.98 Mpa of the high-density polyethylene, which indicates that composite materials obtained from Examples 1, 3 and 4, compared with the original plastics and calcium carbonate or nano silica strengthened plastics, have tensile strength that is not reduced but significantly increased. The data of density indicate that, the composite materials obtained from Examples 1, 3 and 4 are between the original high-density polyethylene and the calcium carbonate or nano silica strengthened polyethylene material in density; compared with the inorganic calcium carbonate or nano silica strengthened polyethylene material, the inorganic/lignin type polymer composite nanoparticles obtained in the present invention have advantage in density; therefore, under the same volume, the composite materials obtained from Examples 1, 3 and 4 have less mass, which characteristic will be advantageous to broadening their application field and reducing cost.

TABLE 2

| Name | Blending mass ratio (strengthening agent:rubber) | Tensile strength (Mpa) | Peeling strength (kN · m$^{-1}$) | Elongation at break (%) |
| --- | --- | --- | --- | --- |
| Acrylonitrile-butadiene rubber | — | 3.09 | 11.87 | 856.13 |
| Nano silica/acrylonitrile-butadiene rubber composite material | 10:100 | 23.87 | 55.75 | 564.78 |
| Products of Example 2/acrylonitrile-butadiene rubber composite material | 10:100 | 28.54 | 61.46 | 682.33 |
| Products of Example 6/acrylonitrile-butadiene rubber composite material | 40:100 | 27.93 | 60.57 | 677.84 |

* The symbol "—" in the table means blank.

Table 2 shows the results of blending modification of the inorganic/lignin type polymer composite nanoparticles obtained from Examples 2 and 6 of the present invention and the acrylonitrile-butadiene rubber. The experimental operation method is as follows: At normal temperature, adding 100 parts of acrylonitrile-butadiene rubber to a two-roller mill, adding in turn 1.5 parts of sulfur, 5 parts of zinc oxide, and 1 part of stearic acid to blend, adding a strengthening agent (nano silica or products of the examples) according to a certain mass ratio (10-40 parts) to blend, and then adding 1 part of an accelerant DM (dibenzothiazole disulfide) to blend for 15 min. Vulcanizing the blending product at 145° C. for 30 min to produce a strengthening agent/acrylonitrile-butadiene rubber composite material. Finally, the tensile strength, peeling strength, elongation at break and other mechanical property data of the composite material are determined with an MTS universal tester. It can be seen from Table 2 that, the tensile strength of the rubber material strengthened with the products obtained from Examples 2 and 6 is obviously greater than that of the nano silica strengthened rubber material currently commonly used in industry. On one hand, the lignin molecules, with many active functional groups on the surface thereof, can provide an intermolecular hydrogen bond, an electrostatic force, the π-π stacking interaction, the cation-π interaction and other various intermolecular forces, and have active chemical reaction activity and good compatibility with the rubber molecules having polarity; with the synergy between the alkaline lignin and the inorganic nanoparticles, the particles are uniformly dispersed and have high surface activity, making the acting force between the inorganic/lignin type polymer composite nanoparticles and the rubber molecules increased, cohesion of gross rubber increased, and the chain segment not easy to slide while being stretched. On the other hand, the three-dimensional spatial network structure of the lignin is advantageous to increasing its crosslinking density with rubber molecules, thus increasing the tensile strength of the rubber composite materials. Besides, it can be seen from this table that, the rubber filled with the products from Examples 2 and 6 is superior in peeling strength to the rubber filled with nano silica. The rubbers strengthened with the products from Examples 2 and 6 and with nano silica have less elongation at break than the pre-compounded acrylonitrile-butadiene rubber, because addition of a filler may increase crosslinking density of the rubber in the vulcanizing process, thus reducing elongation at break of the rubber. However, the rubbers filled with the products from Examples 2 and 6 are both superior to the rubber filled with nano silica, which indicates that the composite materials obtained from Examples 2 and 6 have good toughness, and the rubber is not easy to be destroyed in the deformation process and has exceeded the rubber material strengthened with nano silica that is currently commonly used in industry.

What is claimed is:

1. A method of preparing inorganic/lignin polymer composite nanoparticles, comprising:
   (1) dissolving an alkaline lignin solid into water to formulate a suspension at a concentration of 30%-50% by weight, adjusting the pH to 9-12 with an alkalinity regulator, heating to 60° C. -90° C., adding an activating agent, and reacting for 0.5-2 hours; dissolving a carboxylating agent in a formulation into water to formulate a solution at a concentration of 10%-30% by weight, adding to the above alkaline lignin suspension, and reacting for 1-3 hours at 60° C. -90° C. to obtain carboxylated alkaline lignin;
   (2) dissolving a phosphorylating agent in the formulation into water to formulate a solution at a concentration of 10%-35% by weight, adding epichlorohydrin, heating to 30° C. -90° C., and reacting for 0.5-3 hours to obtain a hydroxyl phosphate compound;
   (3) mixing the carboxylated alkaline lignin in (1) with the hydroxyl phosphate compound in (2), adjusting the pH to 10-13 with an alkalinity regulator, heating to 75° C. -95° C., reacting for 0.5-2 hours, and cooling to room temperature to obtain a liquid lignin polymer;
   (4) adding inorganic nanoparticles into water to formulate a suspension at a concentration of 10%-40% by weight, adding a pretreatment agent, stirring well before adding the liquid lignin polymer in (3), heating to 50° C.-80° C., reacting for 0.5-2 hours, then adding an acidity regulator to regulate the pH to 3-5 before ageing at 50° C. -80° C. for 0.5-4 hours, and then spray-drying to produce the inorganic/lignin polymer composite nanoparticles;
   the amount of each reactant is as follows in parts by weight:

| | |
   |---|---|
   | alkaline lignin | 100 |
   | inorganic nanoparticles | 5-80 |
   | activating agent | 2-10 |
   | carboxylating agent | 5-20 |
   | phosphorylating agent | 5-20 |
   | epichlorohydrin | 5-15 |
   | pretreatment agent | 5-10 | the activating agent is one or two agents selected from the group consisting of dioxane, sodium periodate, ethanol, isopropanol and acetone;
   the inorganic nanoparticles are one selected from the group consisting of nano silica, nano alumina, nano zinc oxide, nano titanium dioxide and nano calcium carbonate;
   the carboxylating agent is one or two agents selected from the group consisting of monochloroacetic acid, monobromoacetic acid, monoiodoacetic acid, sodium monochloroacetate and dichloroacetic acid;
   the phosphorylating agent is one or two agents selected from the group consisting of sodium dihydrogen phosphate, disodium hydrogen phosphate, dipotassium hydrogen phosphate, potassium dihydrogen phosphate, and diammonium hydrogen phosphate; and
   the pretreatment agent is one selected from the group consisting of ethanol, acetone, glycerol, isopropanol and cyclohexane.

2. The method of preparing the inorganic/lignin polymer composite nanoparticles according to claim 1, wherein: the alkaline lignin is one or two substances selected from the group consisting of wheat straw alkaline lignin, bamboo pulp alkaline lignin, reed alkaline lignin, wood pulp alkaline lignin, cotton pulp alkaline lignin and bagasse alkaline lignin.

3. The method of preparing the inorganic/lignin polymer composite nanoparticles according to claim 1, wherein: the alkalinity regulator is NaOH aqueous solution at a concentration of 30% by mass.

4. The method of preparing the inorganic/lignin polymer composite nanoparticles according to claim 1, wherein: the acidity regulator is sulfuric acid, phosphoric acid or hydrochloric acid.

5. The acidity regulator according to claim 4, wherein: the sulfuric acid, the phosphoric acid or the hydrochloric acid has a mass concentration of 10%-30%.

6. An inorganic/lignin polymer composite nanoparticles prepared by the method according to claim 1.

7. Application of the inorganic/lignin polymer composite nanoparticles according to claim 6, wherein: blending the inorganic/lignin polymer composite nanoparticles with plastics or rubbers in an amount of 10%-40% by dry-basis weight of the plastics or the rubbers, to produce a polymer composite material.

8. An inorganic/lignin polymer composite nanoparticle is prepared by the method according to claim 2.

9. An inorganic/lignin polymer composite nanoparticle is prepared by the method according to claim 3.

10. An inorganic/lignin polymer composite nanoparticle is prepared by the method according to claim 4.

11. An inorganic/lignin polymer composite nanoparticle is prepared by the method according to claim 5.

12. Application of the inorganic/lignin polymer composite nanoparticles according to claim 8, wherein: blending the inorganic/lignin polymer composite nanoparticles with plastics or rubbers in an amount of 10%-40% by dry-basis weight of the plastics or the rubbers, to produce a polymer composite material.

13. Application of the inorganic/lignin polymer composite nanoparticles according to claim 9, wherein: blending the inorganic/lignin polymer composite nanoparticles with plastics or rubbers in an amount of 10%-40% by dry-basis weight of the plastics or the rubbers, to produce a polymer composite material.

14. Application of the inorganic/lignin polymer composite nanoparticles according to claim 10, wherein: blending the inorganic/lignin polymer composite nanoparticles with plastics or rubbers in an amount of 10%-40% by dry-basis weight of the plastics or the rubbers, to produce a polymer composite material.

15. Application of the inorganic/lignin polymer composite nanoparticles according to claim 11, wherein: blending the inorganic/lignin polymer composite nanoparticles with plastics or rubbers in an amount of 10%-40% by dry-basis weight of the plastics or the rubbers, to produce a polymer composite material.

* * * * *